United States Patent

Hearns

[15] 3,657,823

[45] Apr. 25, 1972

[54] WEB MONITORING DEVICE

[72] Inventor: Harold L. Hearns, Midland, Mich.

[73] Assignee: The Dow Chemical Company, Midland, Mich.

[22] Filed: Dec. 1, 1969

[21] Appl. No.: 881,009

[52] U.S. Cl. .......................................... 33/172 F, 33/147 L
[51] Int. Cl. ............................................................. G01b 5/00
[58] Field of Search ............ 33/147 R, 147 L, 147 N, 148 R, 33/148 H, 169 R, 172 R, 172 B, 172 E, 172 F

[56] References Cited

UNITED STATES PATENTS

| | | | |
|---|---|---|---|
| 1,671,737 | 5/1928 | Norton | 33/172 R |
| 2,016,420 | 10/1935 | Engst | 33/174 L |
| 2,065,951 | 12/1936 | Terry | 33/172 R |
| 3,126,640 | 3/1964 | Plasser et al. | 33/145 |
| 1,946,924 | 2/1934 | Allen et al. | 33/125 R |
| 3,363,458 | 1/1968 | Scharf et al. | 73/159 |

FOREIGN PATENTS OR APPLICATIONS 451,607 8/1936 England ............................... 33/148 H

*Primary Examiner*—William D. Martin, Jr.
*Attorney*—Griswold and Burdick, Burke M. Halldorson and Richard G. Waterman

[57] ABSTRACT

A device for monitoring film or web changes from the "ideal" thickness while the film is moving, and particularly at strategic locations such as film edge regions. Such a device can comprise a sensing roll or roll means freely rotatably in a yoke member, and, in addition, reversibly "tiltable" about an axis aligned with the direction of film movement. One edge of the roll means engages the moving film against back-up means, and thus "tilts" or moves upwardly responsive to increased film thickness, and downwardly responsive to diminished thickness. Movement of the roll means, in turn, operates an electrical recording means whereby such film thickness deviations are automatically and continuously recorded.

2 Claims, 3 Drawing Figures

INVENTOR.
Harold L. Hearns
BY
ATTORNEY

WEB MONITORING DEVICE

BACKGROUND OF THE INVENTION

1. Field of the Invention

The present invention relates to a film measuring or monitoring device adapted to instantaneously and continuously record film changes from the "ideal" thickness, while the film is moving, such as during its processing or manufacture, and particularly at strategic locations such as film edge regions. More particularly, the invention relates to such a device requiring basically only one movable element, and yet a device that can measure minute film thickness changes irrespective of "out-of-round" back-up rolls or like means employed to support the moving film during measurement.

2. Discussion of the Prior Art

In the manufacture of continuous web materials, such as plastic or paper webs, it is frequently desired to thicken and/or emboss strategic regions or areas of the web depending, of course, on web end use. For example, photographic film products and the like are prepared from web materials, which may be provided with a thickened and/or embossed edge to assist in the manufacture of the film. In order to maintain high quality production standards for such webs, therefore, it is necessary to control and thus continuously measure the hill to valley dimension in the embossed region and/or any thickness deviations of the film at such regions.

Such measurements are optimally taken while the film is moving, during its processing or manufacture, and on a continuous basis. The equipment required for such measurements is preferably of a simple, reliable nature, and yet of sufficient sophistication to record thickness changes in the range, for example, of 0.003 inches and less. Moreover, such equipment must operate accurately even though, for example, the supporting means employed to move the film, and against which the film is usually measured, is of less than "true" specification, an example being out-of-round back-up rolls or the like. Most optimally, such measurements are automatically recorded, giving readings directly correlatable to the measured deviation, if any.

Prior art devices for obtaining such measurements are commonly of a type employing independent measuring means or elements, the relative movement between which, usually in the vertical direction, registers film thickness deviations. Such prior art devices are oftentimes basically of an "on-off" type and, therefore, do not provide for continuous measurement of the film. Moreover, "play" between such measuring elements, as usually results from part wear, can lessen the degree of recordable or measurable relative movement between the elements and, therefore, lessen the accuracy of the measurement. Such devices, in addition, quite frequently have required complicated constructions to avoid inaccuracies occasioned by out-of-round rolls and the like used to support the film during measurement.

It is, therefore, among the objects of the present invention to provide the following:

An improved device for continuously measuring film thickness changes, while the film is moving, and wherein the same is adaptable to measuring strategic regions of the film such as areas where the film is embossed and/or thickened;

Such a device requiring basically only one movable element, the device being capable of making accurate measurements despite out-of-roundness of the back-up rolls or like means employed to support the film during measurement; and Such a device that operates automatically, giving instantaneous readings of film thickness deviations, if any, such reading being directly correlatable to the amount and type of the deviation.

SUMMARY OF THE INVENTION

Briefly then, the present invention contemplates an improved device for continuously measuring film thickness deviations, automatically, and while the film is moving such as during its processing or manufacture. Advantageously, the device basically requires only one movable element, a sensing roll or roll means, the sensing roll being freely rotatable in a yoke member, and, in addition, reversely "tiltable" or movable about an axis aligned with film movement. Such tilting movement can be accurately and instantaneously detected, for example, by a transducer of a type adapted to produce a variable voltage responsive to the position of a core member slidably carried within the transducer. Specifically, the transducer or core, alternatively, is mounted to move with the sensing roll, such as by attachment to the yoke member, whereby relative movement of the core in the transducer is obtained, thereby varying the voltage output of the transducer. Such voltage output can be directed to voltage recording means, and the latter correlated to give direct readings of film thickness deviations, if any. As will be explained more fully hereinafter, such a device accurately measures such deviations, irrespective of out-of-round back-up rolls or the like as are conveniently employed to support the moving film during measurement.

BRIEF DESCRIPTION OF THE DRAWINGS

A preferred embodiment of the present invention is shown in the accompanying drawings wherein.

DESCRIPTION OF THE PREFERRED EMBODIMENT

Figure 1:
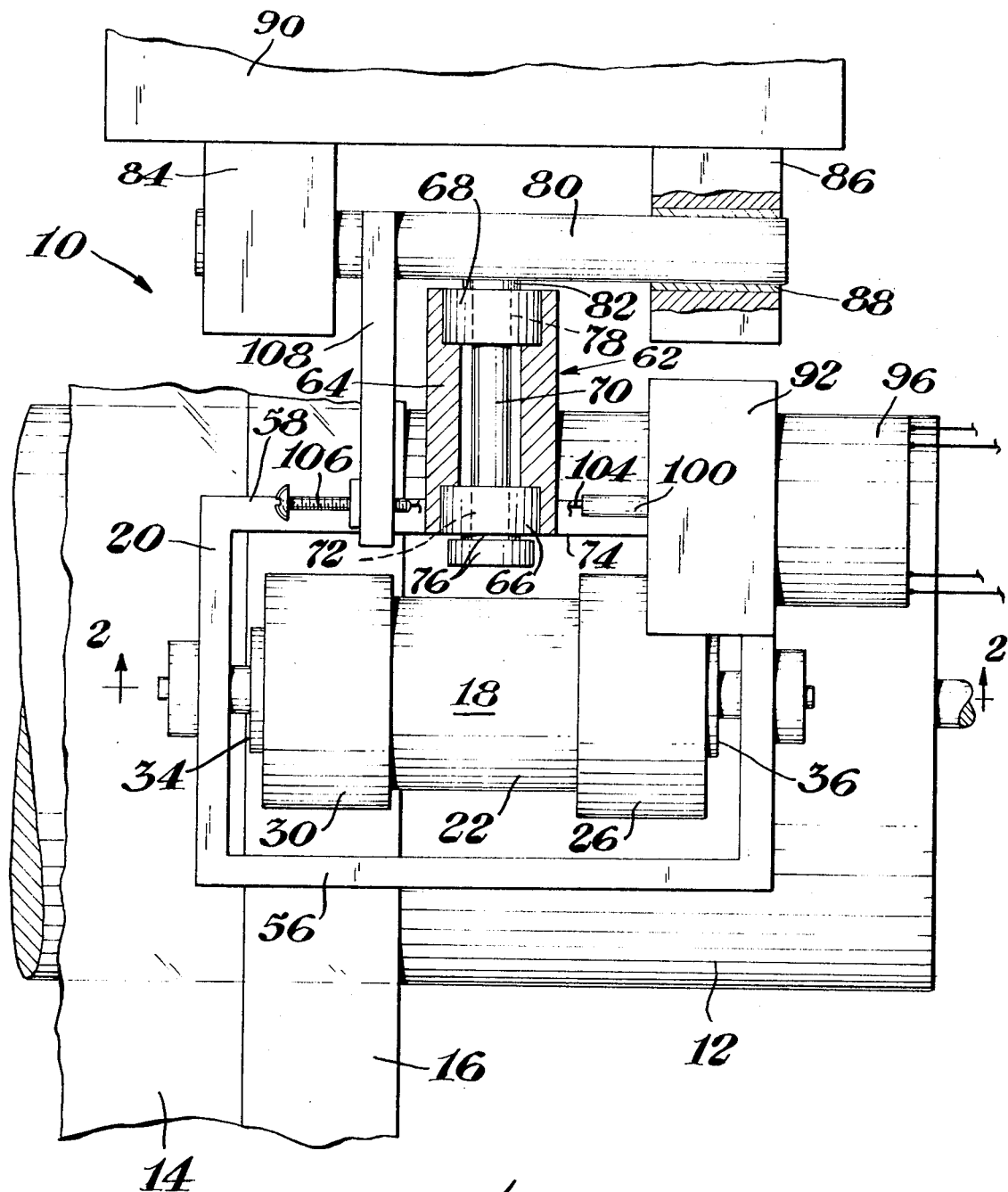
FIG. 1 is a top view of a film thickness monitoring device constructed according to the principles of the present invention, with certain parts broken away and cross-sectioned.

Referring now to the drawings, there is shown a film monitoring device 10 adapted to detect and record film or web thickness changes, especially at film edge regions; a back-up roll or anvil means 12 cooperatively engaging device 10, and a film or web 14 being received between device 10 and back-up roll 12 to effect measurement of the same. Film 14 can be of a type, for example, including a thickened and/or embossed edge 16 (the edge being measured) such as is frequently used in preparing photographic film products.

Device 10 comprises a sensing roll or roll means 18 freely rotatable in a yoke or frame member 20, and rotatably driven by back-up roll 12, the latter, in turn, being operated by a conventional drive mechanism such as an electric motor (not shown).

Sensing roll 18 is preferably recessed at its midregion 22, and defines at one end 24, a first cylindrical edge or sensing means 26 directly engaging back-up roll 12, and at its opposite end 28, a second cylindrical edge or sensing means 30 coaxially aligned with first wheel 26, and which "rides" atop thickened edge 16.

Figure 2:
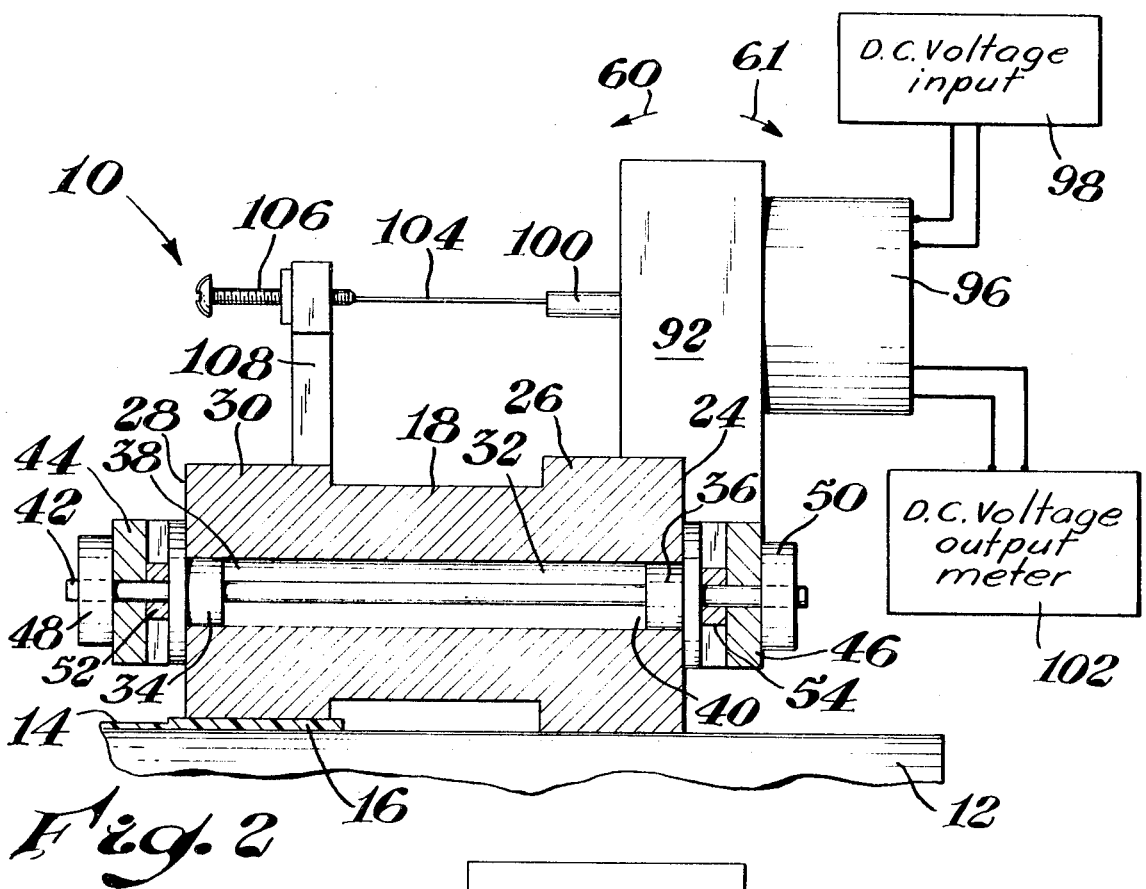
FIG. 2 is a cross-sectional view of the device of FIG. 1 taken along reference line 2—2 thereof.

Referring yet more specifically to sensing roll 18, the same is hollowed at its center to define a coaxially extending above 32 (see FIG. 2). Flanged bearing means such as ball bearings 34 and 36 and "pressed in" or otherwise suitably fitted in bore ends 38 and 40, respectively. An axle 42 is extended through bore 32 and securely journaled in bearings 34 and 36, thereby permitting the free rotational movement of sensing roll 18 about axle 42, as in part explained above. Outwardly of bearings 34 and 36, axle 42 is carried by arm portions 44 and 46, respectively, of yoke 20 and adjacent the outer face regions of the yoke, attached to set collars 48 and 50, respectively. Spacers or washers 52 and 54 can be interposed between bearings 34 and 36 and arm portions 44 and 46, respectively, such as to effectively restrict lateral movement of sensing roll 18 on axle 42.

Yoke 20 can be of generally four sided or rectangular configuration including, in addition, rigid front and back side portions 56 and 58, respectively. The assemblage comprising yoke 20 and sensing roll 18 is reversely tiltable or movable as denoted by arrows 60 and 61 (FIG. 2) through connection to an axle assemblage 62 (FIG. 1) including a hollow casing 64 rigidly extended from backside portion 58. Inset coaxially in casing 64 are bearing means such as ball bearings 66 and 68. An axle or rod 70 is journalably fitted in bearings 66 and 68, and extends at its forward end 72 to a position adjacent the inner face 74 of backside portion 58, and there is secured by a set collar and spacer or washer assembly 76. At its opposite end 78, rod 70 is extended to a position beyond casing 64 and rigidly joined together with a mounting shaft 80, normally with the provision of a spacer of washer 82 between the casing and mounting shaft. Mounting shaft 80, in turn, is rotatably carried at its ends in blocks 84 and 86, the latter including bushings 88 to minimize friction and wear between the shaft and the mounting blocks. Blocks 84 and 86, inturn, rigidly attach to a support as denoted schematically at 90, on back-up roll 12 in the manner as indicated in the drawings.

Figure 3:
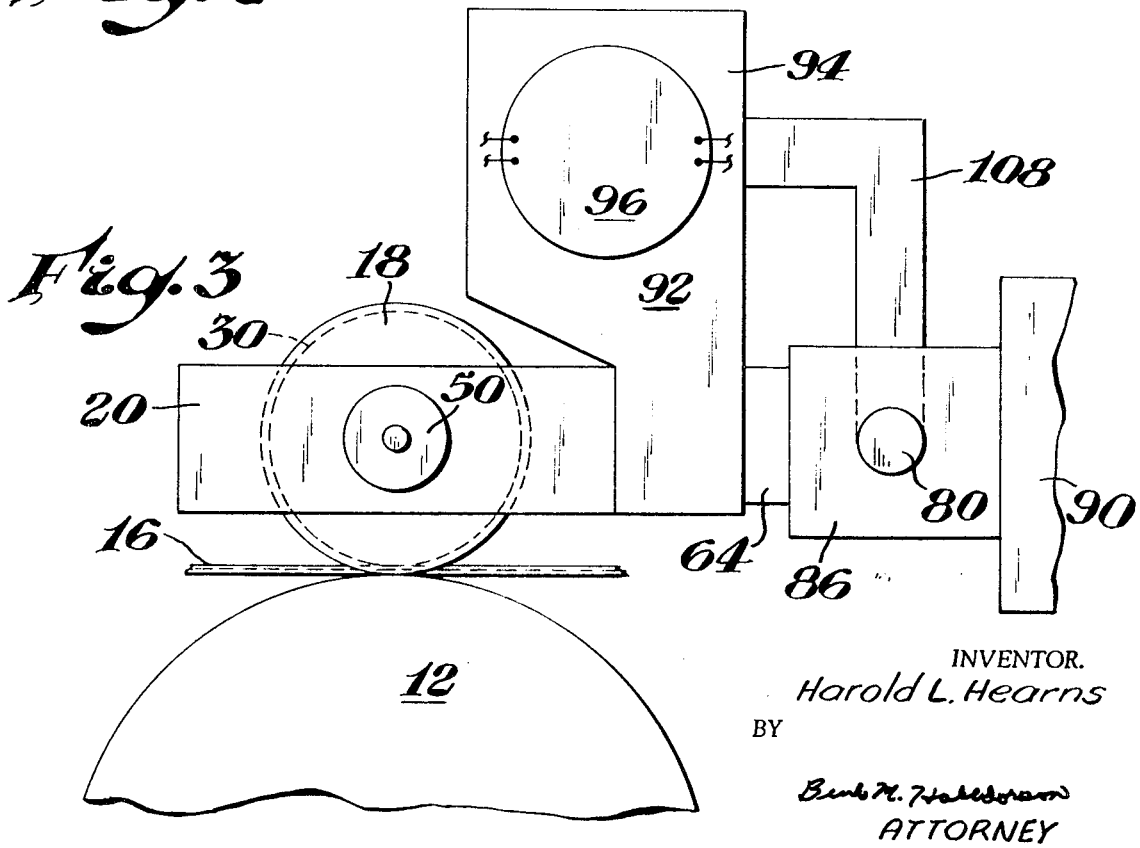
FIG. 3 is a side view of the device of FIG. 1.

Referring now particularly to FIG. 3, a vertically disposed frame piece 92 is fixedly attached to backside portion 58 at a position to one side of casing 64. Frame piece 92 is hollowed at its top end 94 to fixedly receive an electrical transducer 96. Transducer 96 can be of a conventional type operated by a constant DC input voltage source 98, and adapted to produce a variable DC output voltage responsive to the position of a soft iron core member 100 slidably carried in transducer 96. Such variable DC output voltage is readable to voltage meter 102.

Core 100 is slidably operated by fixed attachment to an element 104, comprising for example, stiff piano wire or the like. Wire 104, in turn, fixedly connects to a set screw assembly 106 disposed generally in alignment with core 100, and which, in turn, is rigidly mounted to one end of an elbow-shaped member 108. The other end of member 108 is rigidly attached to mounting shaft 80, as is best shown in FIG. 3.

OPERATION

To operate device 10, a sample film of ideal edge thickness can first, for example, be introduced between second wheel 30 and back-up roll 12, and set screw assembly 106 employed to adjustably position core 100 in transducer 96 such that the latter registers a zero output voltage reading at meter 100.

Thereafter, the film 14 to be measured is fed between back-up roll 12 and second wheel 30, and back-up roll 12 driven or operated to continuously forward the film therebetween. Second wheel 30, continuously riding on edge 16, is thus forcibly moved or "tilted" upwardly about the axis of rod 70, responsive to edge 16 thickness deviations greater than ideal, or downwardly responsive to diminished thickness. Transducer 96 instantly responds to such movement through rigid connection with backside portion 58 of yoke 20, and is thus moved arcuately to the right as denoted by arrow 61 (thickness greater than ideal) or to the left as denoted by arrow 60 (thickness less than ideal). Such movement thus causes a "repositioning" of core 100 within transducer 96, thereby registering a change in the output voltage of the transducer. Meter 102 registering such changes, can be calibrated to give, for example, voltage readings, plus or minus of zero, directly correlatable to the amount of increased or decreased edge 16 thickness. A zero reading at meter 102, of course, indicates no change, or in other words, the maintenance of ideal thickness at edge 16. As is readily evident, out-of-roundness of back-up roll 12 harmlessly moves device 10 up and down about the axis of shaft 80, but occasions substantially no tilting movement as would lessen the accuracy of the measurement.

Sensing roll 18 and back-up roll 12 are preferably constructed of hard metals, such as steel and the like. If desired, the radius of second wheel 30 can be cut back somewhat, a distance approximately that of "ideal" edge 16 thickness, whereby sensing roll 18 is horizontal on back-up roll 12 at ideal conditions.

Wire 104 is of sufficient flexibility to permit core 100 to move within transducer 96 responsive to arcuate movement of the latter, and without binding; and is of sufficient stiffness not to "kink" or otherwise distort under compression of the level encountered when moving transducer 96 to the left.

The above description of the invention along with the accompanying drawings are for the purpose of illustrating the preferred embodiment, and it is to be understood that changes may be made in the structural details and applications of the same without departing from the scope of the present invention. Thus, for example, applications requiring measurements other than at edge regions, and for materials other than paper or plastic webs, can successfully employ the measuring device of the present invention.

What is claimed is:

1. A device for sensing thickness variations in a moving continuous workpiece, said device comprising a rotatable anvil means, first and second sensor means aligned substantially in the direction of the axis of revolution of said anvil means, means mounting said sensor means to ride in place on and follow the contour of the anvil means as the latter rotates, and to reversely tilt as a unit about an axis aligned with the direction of movement of said workpiece, whereby by feeding the moving workpiece between one of said sensors and the anvil means, changes in the thickness of the workpiece are responded to automatically via angular displacements about said axis of tilt.

2. The device of claim 1 wherein said first and second sensor means comprise a unitary rotatable element.

* * * * *